June 2, 1959     H. S. HORN     2,888,933
TRANSPARENT DISPLAY AND FILING DEVICE
Filed March 26, 1954     2 Sheets-Sheet 1
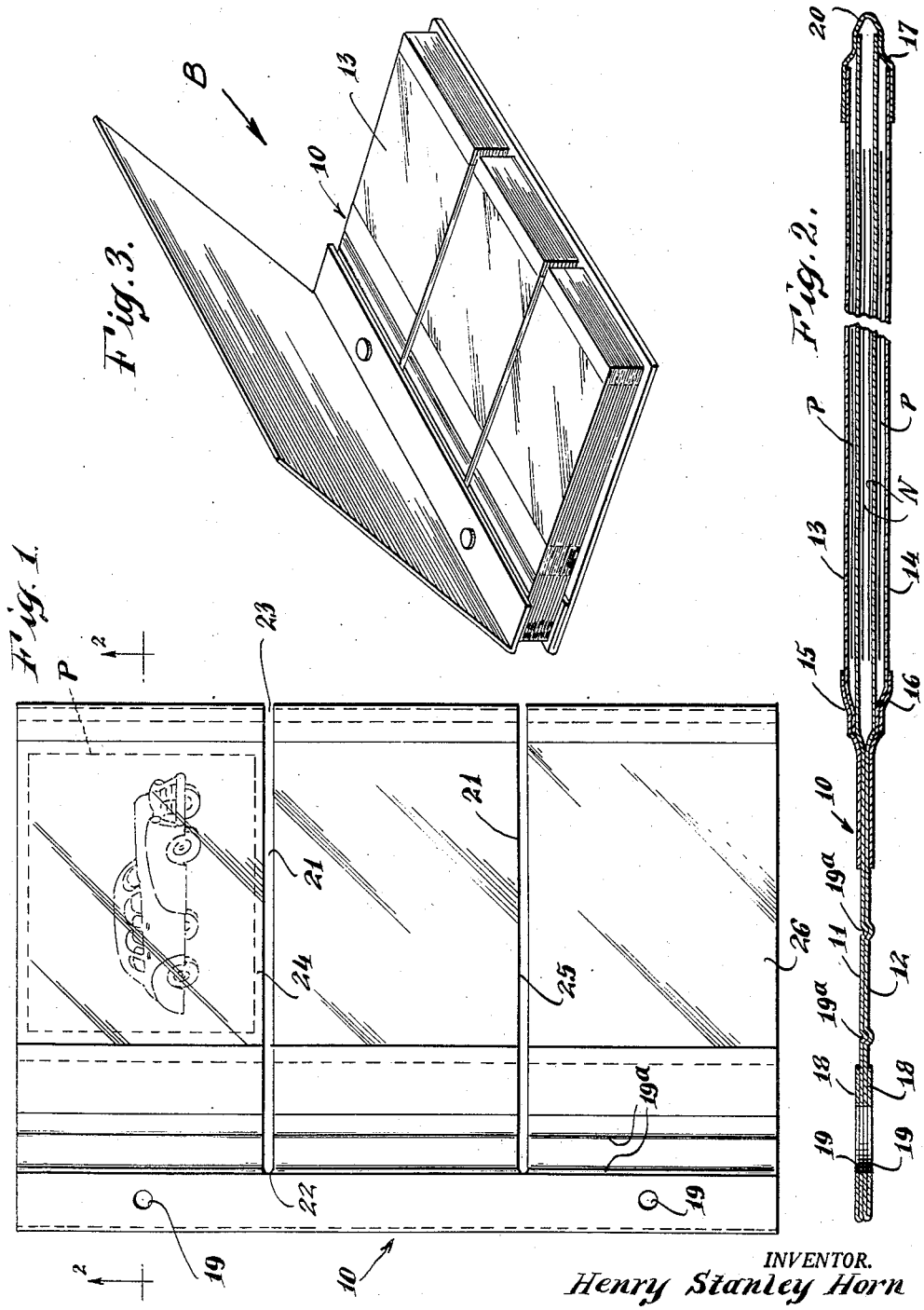
INVENTOR.
*Henry Stanley Horn*
BY
*Churchill, Rich, Weymouth & Engel*
ATTORNEYS

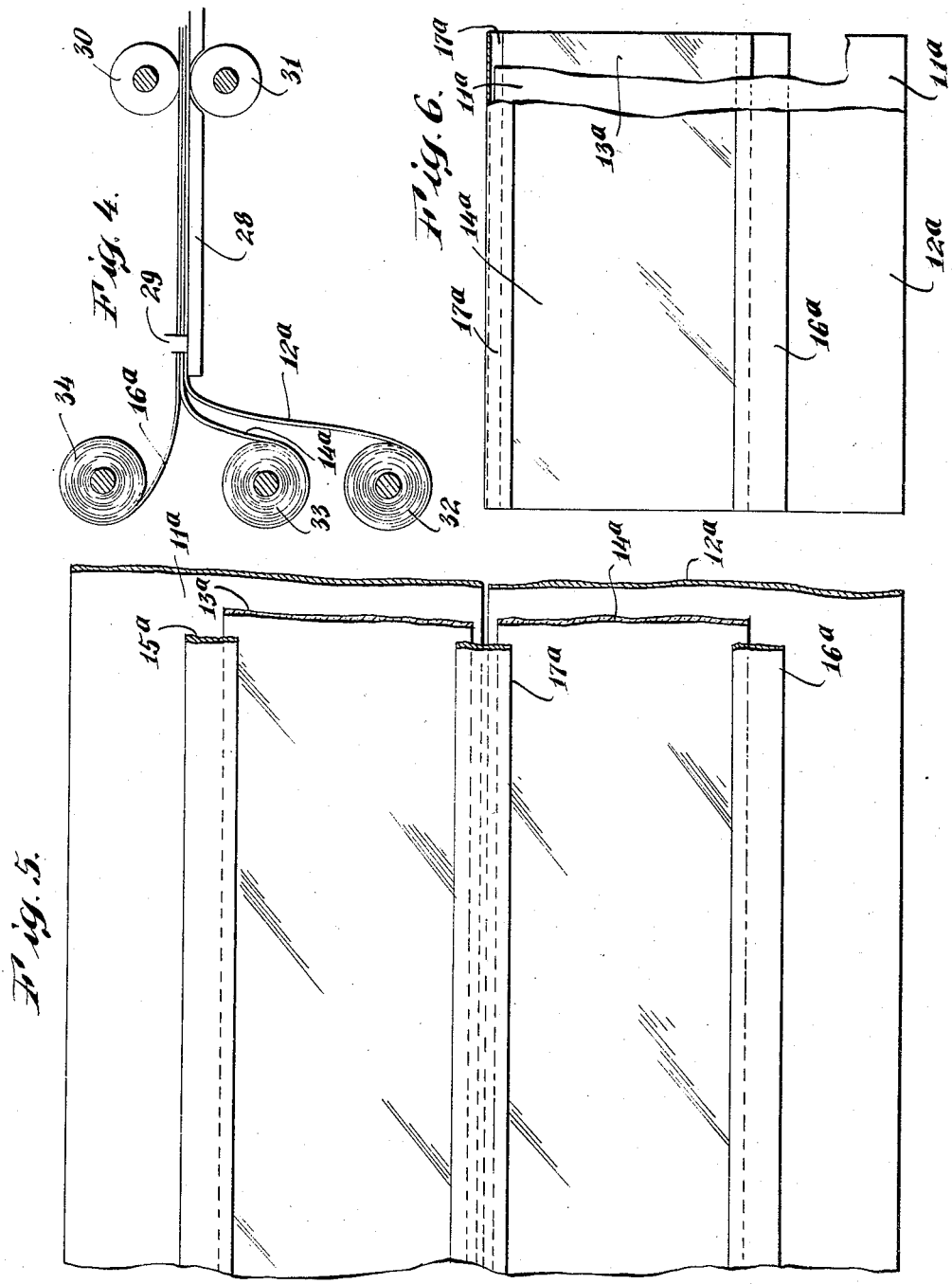

2,888,933

TRANSPARENT DISPLAY AND FILING DEVICE

Henry Stanley Horn, South Orange, N.J., assignor to W. C. Horn, Bro. & Co., Newark, N.J., a corporation of New Jersey Application March 26, 1954, Serial No. 418,991

3 Claims. (Cl. 129—20)

My present invention relates to transparent display and filing devices for photographic prints, negatives, advertising copy and the like, and constitutes an improvement over the devices shown and described in my co-pending application, Serial No. 155,495, filed April 12, 1950, now abandoned.

Heretofore many forms of transparent display and filing devices of the general character set forth have been made and sold, but for one reason or another they have not met with popular favor, probably because they were too bulky, too costly or involved difficult manufacturing operations.

My present invention seeks to overcome the aforementioned deficiencies in prior devices, and includes among its various objects: (1) to provide a protective display and filing device made of relatively thin stock, a plurality of such devices being adapted to be bound in a book and wherein each display device has on each face thereof provision for mounting photo prints adapted to be held in place by the transparent protective material of the device; (2) to provide such display devices each of which has a common binding portion and a plurality of independently movable, connected display portions each having readily accessible compartments for the display material; (3) to provide such display devices wherein the backs of the display material will not be visible from the opposite faces of the display device and wherein, when photo prints are displayed, the negatives from which said prints were made may be invisibly stored between the leaves of a display device rearwardly of the prints; (4) to provide display devices of the character set forth such that, when a plurality of similarly formed and dimensioned display devices each having a common binder portion and a plurality of independently movable display portions are clamped in a binder or album, they will provide a plurality of groups of superposed displays, any one group of which may be examined independently of the other groups; and (5) to provide such display devices which will have eye appeal and may be produced in a relatively simple manner and therefore sold at a reasonable price. A more specific and important object of the invention is to provide a display device having the various characteristics hereinabove set forth and wherein the transparent protective material will be held under tension against the faces of the backing sheets and thereby serve to firmly hold in place prints or the like disposed between said transparent protective sheet and the backing sheet.

The foregoing and other objects of my invention not specifically enumerated and the manner in which the various objects of the invention are accomplished will be readily understood from the detailed description which follows, when considered in connection with the accompanying drawings, wherein:

Figure 1 is a plan view of a protective display and filing device embodying my invention.

Fig. 2 is a transverse section, on a greatly enlarged scale, taken along the plane of the line 2—2 of Fig. 1.

Fig. 3 is a perspective view of a book embodying the invention.

Fig. 4 is a diagrammatic side elevation showing the manner of assembling the composite stock from which the diplay device is made.

Fig. 5 is a fractional top plan view showing the relationship of the respective elements in forming the composite stock from which the display device shown in Figs. 1 to 3 is made.

Fig. 6 is a fractional plan view showing an intermediate step in the production of the display device shown in Figs. 1, 2 and 3.

Referring first to Figs. 1, 2 and 3 of the drawings, the transparent display and filing device indicated as a whole by the reference numeral 10 may be said to consist of a pair of separate rectangular opaque supporting or backing sheets or leaves 11 and 12 formed of relatively stiff paper disposed in back-to-back relation, said leaves each having mounted over the exposed face thereof, a rectangular transparent sheet of protective material 13, 14, of less width than the paper leaf and having their edges which extend parallel to the length of the sheet spaced inwardly from the corresponding edges of the paper leaf and adhesively bonded to said leaf by overlying secondary sealing tapes 15, 16 and a primary sealing tape 17.

Each of the backing leaves at its left hand margin, as viewed in the drawing, has a turned-back reinforcing flap 18 to provide a marginal binder portion which is formed with registering perforations 19 for facilitating clamping a plurality of display devices to constitute the pages of a book B or the like. To increase the flexibility and ease of turning or riffling the pages, the paper leaves 11 and 12 may be formed with one or more embossed parallel lines or creases 19a extending lengthwise on the binder portion and laterally spaced from the adjacent edges of the tapes 15 and 16.

The sheets of transparent protective material 13 and 14 may be formed of any suitable synthetic plastic material, such as cellulose acetate, and have their opposite edges which extend parallel to the binding portion spaced inwardly from the corresponding edges of the backing leaves so that the sealing tapes partly overlie and are adhesively bonded to the said edge portions of the transparent sheets and to the adjacent portions of the backing leaves.

The sealing tapes 15, 16 and 17 may be formed of any suitable material which will adhere to both the plastic material and the backing leaves and will serve to bond them together. Preferably, the sealing tapes employed are of the hot sealing type, i.e., of a character such that when heat and pressure is applied thereto they will bond to the material with which they are in engagement. The sealing tapes 15 and 16 each serves to bond the left hand marginal portion of the plastic sheets 13 and 14 to a backing leaf 11 and 12, respectively, whereas the tape 17 serves to bond the right hand marginal portions of the plastic sheets 13 and 14 to the corresponding edge portions of the leaves 11 and 12, respectively, the tape 17 being thus provided with a longitudinal crease 20 which is disposed in outwardly spaced relation to the adjacent edges of the backing leaves.

The protective display device as hereinbefore described is primarily adapted to accommodate relatively large flat displays of material when disposed between a transparent sheet and a backing leaf. Where the device is to be used for the display of relatively small display material such as photographic prints, it is desirable to have each display portion of the display device of a size not much larger than the display material, and to accomplish this and to facilitate the introduction and removal of such display material, the device is die-cut to provide one or more slots 21 which extend from a point 22 on or adjacent the binding portion of the device through the opposite edge of the device, as indicated at 23, the slot or slots extending at a right angle to the binding portion. In this manner a plurality of independently, readily accessible display units 24, 25 and 26 are provided, each open at its top and bottom.

In Fig. 2 the various elements are shown greatly enlarged for the sake of clarity. It will be understood, however, that when the display devices 10 are clamped in a binder, the contiguous faces of the backing leaves, and the contiguous faces of the plastic sheets and backing leaves will be substantially in face-to-face contact and will serve to snugly hold prints P between a backing leaf and a protective transparent sheet and will likewise serve to firmly hold a negative or negatives N between the contiguous faces of the paper leaves rearwardly of the displayed prints P.

For the sake of economy and facility in carrying out the manufacturing operations in making the embodiment of the invention shown in Figs. 1, 2 and 3, the thickness of the transparent sheet material 13 and 14 should be no greater than .003 of an inch. When plastic material of such thinness is employed, however, it is essential that it be held as snugly to the face of its backing leaf as possible and I have found that this can best be accomplished when the opposite edge portions of the plastic material are held in firm contact with the backing leaves. Accordingly, it will be noted from the drawing that the tapes 15, 16 and 17 overlie and are bonded to a substantial width of the edge portions of the plastic material 13 and 14 and likewise overlie and are bonded to a substantial width portion of the backing leaves. In fact, the plastic must be applied and bonded to both the plastic and to the paper while held under tension. This is accomplished in the course of forming the composite stock from which the display is made in the manner as hereinbefore described.

When a plurality of similarly formed and equally dimensioned display devices each having a common binder portion and a plurality of independently movable display portions are mounted in a binder they provide a plurality of groups of superposed display portions, each group of which may be utilized to display photographic prints or display matter relating to a common event or subject matter and hence any one group may be examined independently of the other groups, by the display portions of a particular group being riffled or leaved through and the display matter thereof glanced at or more carefully examined.

In Figs. 4, 5 and 6 of the drawings, there is illustrated a preferred manner in which the composite material of the display devices shown in Figs. 1, 2 and 3 are made. In Fig. 4 there is shown a table 28 of a sheeting machine having laterally spaced guides 29 between which are simultaneously fed under tension a pair of paper ribbons 11a and 12a in lateral, closely spaced relation from supply rolls 32 only one of which is shown; a pair of transparent plastic ribbons 13a and 14a narrower than the paper ribbons and spaced a greater distance apart than the paper ribbons and overlying said paper ribbons are fed from supply rolls 33, only one of which is shown; and three sealing tapes 15a, 16a, and 17a from supply rolls 34, only one of which is shown, said tapes each overlying the adjacent edge portions of the plastic and paper ribbons and being preheated by means not shown. At a suitable location on the table 28, by a pair of rollers 30 and 31, pressure is applied to bond said heated sealing tapes to both the underlying ribbons of paper and ribbons of plastic. After the composite sheet is formed, it is cut into predetermined lengths corresponding to the length of the display devices for a particular size book, after which the predetermined cut lengths are folded along the center line of the intermediate tape 17a with the plastic material disposed outwardly, as shown in Fig. 6. The folded units are then subjected in a conventional manner to form the scoring 19a and the perforations 19. A plurality of such formed display devices may then be clamped within a binder or album by a screw or equivalent clamping means extending through the perforations 19 when desired to assemble a plurality of displays in book form. In forming the embodiment of the invention shown in Fig. 2a, the central tape 17a is omitted and a single ribbon of plastic is used.

From the foregoing detailed description it will be apparent that I have provided simple, economical and effective display devices adapted to accomplish the various objects described in the opening statement of the specification and, although I have shown and described two embodiments of my invention, changes in the constructional details and manner of making the devices may be resorted to within the range of mechanical skill, without departing from the spirit of the invention as hereinafter claimed.

What I claim is:

1. A protective display and filing device adapted for mounting in a binder, comprising a pair of separate rectangular, opaque backing sheets of the same size disposed in back to back registering relation, each sheet having a marginal binder portion, a pair of rectangular sheets of transparent material of the same size, each of less width than the same height as the backing sheets overlying an exposed face of said backing sheets and having their lateral edges defining the width of the sheets spaced inwardly from the corresponding adjacent edges of the backing sheets and their edges defining their height in registry with the corresponding adjacent edges of the backing sheets, a medially creased primary tape embracing the corresponding edge portions of both backing sheets remote from the binder portion and the corresponding edge portions of both transparent sheets and adhesively bonded to said respective edge portions of the backing sheets and transparent sheets with the crease in the tape spaced laterally outward to the corresponding edges of the backing sheets, and secondary tapes overlying the opposite edge portions of said transparent sheets and the adjacent portions of the backing sheets and adhesively bonded to said respective sheets, said transparent sheets being bonded to the backing sheets only by the aforementioned primary and secondary tapes.

2. A protective display device according to claim 1 having at least one common slot extending through the device from a point on the binder portion through the edge portion provided with the primary tape and extending at a right angle thereto whereby to provide a plurality of distinct, independently movable display portions on the common binder portion, and the slot provides access to the display space between the backing sheets and the transparent sheets and to the storage space between the backing leaves of said independently movable display portions.

3. A book comprising a plurality of leaves, each comprising a pair of separate rectangular, opaque backing sheets of the same size disposed in back-to-back registering relation, each sheet having a marginal binder portion, a pair of rectangular sheets of transparent material of the same size, each of less width than and the same height as the backing sheets overlying an exposed face of said backing sheets and having their lateral edges defining the width of the sheets spaced inwardly from the corresponding adjacent edges of the backing sheets and their edges defining their height in registry with the corresponding adjacent edges of the backing sheets, a medially creased primary tape embracing the corresponding edge portions of both backing sheets remote from the binder portion and the corresponding edge portions of both transparent sheets and adhesively bonded to said respective edge portions of the backing sheets and transparent sheets with the crease in the tape spaced laterally outward to the corresponding edges of the backing sheets, and secondary tapes overlying the opposite edge portions of said transparent sheets and the adjacent portions of the backing sheets and adhesively bonded to said respective sheets, said transparent sheets being bonded to the backing sheets only by the aforementioned primary and secondary tapes, each leaf having at least one common slot extending from a point on the binder portion perpendicularly thereto through the edge of the leaf provided with the primary tape to provide a plurality of distinct, independently movable display portions on a common binder portion, the slots in the respective leaves being in overlying registry, whereby to provide a plurality of groups of superposed display portions, any one group of which may be examined independently of another group.

References Cited in the file of this patent

UNITED STATES PATENTS

| | | |
|---|---|---|
| 1,320,683 | Goodhue | Nov. 4, 1919 |
| 1,927,266 | Huttner | Sept. 19, 1933 |
| 2,052,623 | Harby | Sept. 1, 1936 |
| 2,068,011 | Engel | Jan. 19, 1937 |
| 2,138,788 | Hart et al. | Nov. 29, 1938 |
| 2,232,975 | Schade | Feb. 25, 1941 |
| 2,282,872 | Mayer et al. | May 12, 1942 |
| 2,421,503 | Hermon | June 3, 1947 |
| 2,477,886 | McCaskill | Aug. 2, 1949 |

FOREIGN PATENTS

| | | |
|---|---|---|
| 113,706 | Great Britain | Mar. 7, 1918 |
| 500,226 | Great Britain | Feb. 6, 1939 |
| 530,555 | Great Britain | Dec. 13, 1940 |
| 478,848 | Italy | Mar. 5, 1953 |